Feb. 28, 1961  J. V. ANSELMI  2,972,831
LIVE BAIT HOLDER AND HARNESS
Filed July 29, 1958

INVENTOR
James V. Anselmi

BY Stevens, Davis, Miller and Mosher
ATTORNEY

United States Patent Office 2,972,831
Patented Feb. 28, 1961

2,972,831

LIVE BAIT HOLDER AND HARNESS

James V. Anselmi, 16 Essex St., Deep River, Conn.

Filed July 29, 1958, Ser. No. 752,160

6 Claims. (Cl. 43—44.4)

This invention relates to fishing lures and more particularly to fish bait holders of the type adapted to hold live bait in proximity to fish hooks without penetration of the bait.

The advantage of live bait for certain piscatological purposes is well established and acknowledged by most fishermen. However, live bait holders of the type presently known involve such disadvantages as to discourage their use. Many of these devices fail to hold the bait securely and it is lost in the cast; others are so complicated or awkwardly arranged that much effort and handling of the bait is necessary to secure the bait in place. But even when these problems are minimized, the devices are still limited in use, because they are designed for a particular size of bait and can be effectively used only with that size. When using live bait such as eels, an efficient bait holder must be capable of adjusting to accommodate a variety of sizes, as each eel used will vary slightly in length and thickness. When using live bait such as eels, it is also necessary that the eel be held firmly and with sufficient rigidity to keep it from wrapping around the line and yet allow for some movement of the head and tail.

It is, therefore, an object of the present invention to provide an improved live bait holder that is capable of adjustment to accommodate various sizes of bait.

It is another object of this invention to provide such an adjustable live bait holder, which will hold the bait securely without penetrating or in any way injuring the bait.

It is a further object of this invention to provide such an adjustable live bait holder which may be applied to the live bait with a minimum of effort, yet hold the bait securely but flexible allowing for free movement of the bait's head and tail.

Further and other objects will become apparent from the following specification in which like numerals refer to like parts.

Figure 1:
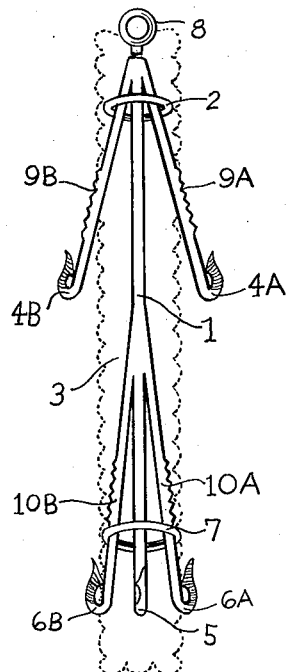
Fig. 1 is a top plan view showing the harness in dotted lines.

The shank 1 is provided at its extreme forward end with an eyelet 8 to which a suitable line can be attached. Attached to the other end of the shank 1 and extending rearwardly therefrom are the upturned rear hook 5, and the rear side hooks 6A and 6B. The upturned rear hook 5 extends on the same plane and in the same direction as the shank 1. The rear side hooks 6A and 6B extend slightly downwardly from the plane of shank 1 and at five to ten degree angles away from opposite sides of the shank 1. The hook portions of rear side hooks 6A and 6B turn downwardly. The outer opposite sides of the rear side hooks 6A and 6B are provided with rows of teeth 10A and 10B. A rear ring 7 encircles the shank portions of the hooks 5, 6A and 6B and has an inner diameter slightly shorter than the distance between the rows of teeth 10A and 10B.

The forward side hooks 4A and 4B are attached to the shank 1 toward the forward end of said shank 1 and extend rearwardly therefrom. The forward side hooks 4A and 4B extend slightly downwardly from the plane of shank 1 and at five to ten degree angles away from opposite sides of the shank 1. The hook portions of the forward side hooks 4A and 4B turn downwardly. The outer opposite sides of the forward side hooks 4A and 4B are provided with rows of teeth 9A and 9B. A forward ring 2 encircles the shank 1 and the shank portions of forward side hooks 4A and 4B and has an inner diameter slightly shorter than the distance between the rows of teeth 9A and 9B.

Figure 3:
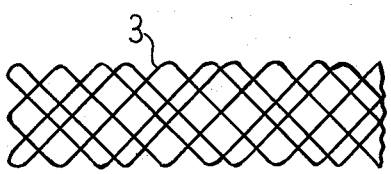
Fig. 3 is an enlarged fragmentary side elevational view of the harness in its normal position.

Attached to the underneath side of shank 1 toward the forward end thereof at attachment 11, is the harness 3. The harness 3, as will be understood from reference to Fig. 3, is composed of relatively flexible wire braids interwoven in a helical pattern so as to form a flexible mesh sheath of substantially tubular configurations. The harness is attached to the underneath side of shank 1 at attachment 11, by soldering or any other suitable means. The harness 3 extends beneath and in proximity to the shank 1 and essentially parallel thereto. The length of the harness 3 is approximately the same as the length between the eyelet 8 and the hook portion of upturned rear hook 5. It will be understood from the foregoing and seen from reference to Figs. 1 and 2, that the harness 3 is normally positioned between forward side hooks 4A and 4B as well as between rear side hooks 6A and 6B.

Figure 4:
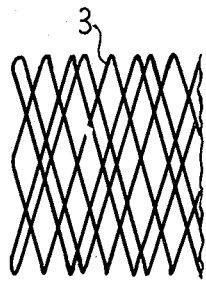
Fig. 4 is an enlarged fragmentary elevational view of the harness in a circumferentially expanded, longitudinally contracted position.

It will be understood from reference to Figs. 3 and 4, that when pressure is applied to opposite ends of the harness 3, it contracts longitudinally and expands circumferentially. When pressure is related it returns to its normal circumference. The type of flexible wire mesh sheath which forms harness 3 is well known and its tendency to expand circumferentially in response to pressure against its opposite ends and return to its normal circumference when the pressure is releasd is well understood.

Figure 2:
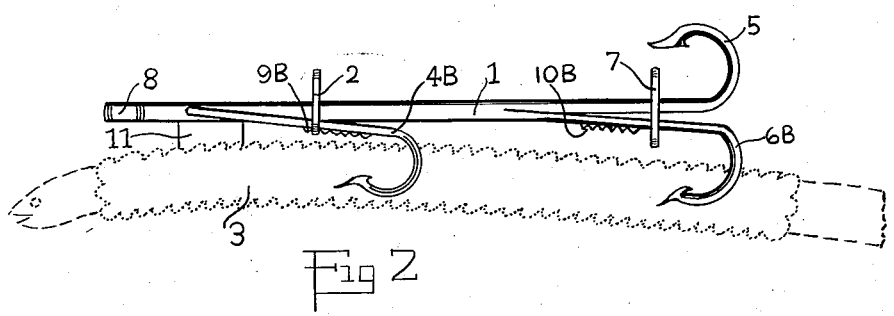
Fig. 2 is a side elevational view showing the harness and the bait such as an eel in dotted lines.

To place the bait in the harness 3, as illustrated in Fig. 2, pressure is exerted against opposite ends of the harness 3 effecting a circumferential expansion. The bait is then placed within the tubular sheath which forms the harness 3, so that its head protrudes beyond the forward end of the harness 3 and its tail extends beyond the rear end of the harness 3. When the bait is so placed, pressure is released from against the opposite ends of the harness 3, which then returns to its normal circumference thus enclosing and firmly gripping the bait.

When the bait is positioned in the harness 3 as aforementioned, the rear ring 7 is moved rearwardly until the hook portions of rear side hooks 6A and 6B are pressed tightly against the sides of the harness. The forward ring 2 is similarly moved rearwardly until the hook portions of rear side hooks 4A and 4B are pressed tightly against the sides of the harness. In this position, as illustrated in Fig. 2, the bait is held snugly within the harness 3. The harness 3 is attached at 11 to the shank 1, and held between hooks 4A and 4B and between hooks 6A and 6B. The harness allows just enough flexibility to avoid injury to bait and permit some natural movement of the bait.

It will be understood from the foregoing that since the hooks 4A, 4B, 6A and 6B, as well as the harness 3, can be adjusted to a variety of positions, eels of varying sizes can be used in this live bait harness. It will also be understood, that with such minor variations in shapes and sizes, as will be obvious to those skilled in the art, this live bait holder can be made applicable to live bait, other than eels. Other modifications within the spirit of the invention may occur to those skilled in the art, and therefore, it is intended that no limitations be placed on the invention except as defined by the scope of the appended claims.

What is claimed is:

1. A live bait holder comprising means for attaching a line thereto, a shank, at least one side hook attached to each side of said shank and extending downwardly from said shank at an angle less than 90° and biasing out from said shank at an angle less than 90°, means to force said side hooks toward one another, means to retain said side hooks so forced in a substantially fixed position, and a harnessing means fixed to the downward side of said shank and extending substantially parallel thereto so that said harnessing means extends between said side hooks.

2. A live bait holder comprising means for attaching a line thereto, a shank, at least one side hook attached to each side of said shank and extending downwardly from said shank at an angle less than 90° and biasing out from said shank at an angle less than 90°, means to force said side hooks toward one another, means to retain said side hooks so forced in a substantially fixed position, and a resilient harnessing means of substantially tubular configuration fixed to the downward side of said shank and extending substantially parallel thereto so that said harnessing means extends between said side hooks.

3. A live bait holder comprising means for attaching a line thereto, a shank, at least one rear side hook attached to each side of said shank toward the rear end of said shank and extending downwardly from said shank at an angle less than 90° and biasing out from said shank at an angle less than 90°, means to force said rear side hooks toward one another, means to retain said rear side hooks so forced in a substantially fixed position, at least one forward side hook attached to each side of said shank toward the forward end of said shank and extending downwardly from said shank at an angle less than 90° and out from said shank at an angle less than 90°, a freely slidable ring surrounding said shank and said forward side hooks at a point near their attachment to said shank, so that rearward movement of said ring forces said forward side hooks toward one another, means to retain said forward side hooks so forced in a substantially fixed position, and a harnessing means fixed to the downward side of said shank and extending substantially parallel thereto so that said harnessing means extends between the said forward side hooks and between the said rear side hooks.

4. A live bait holder comprising means for attaching a line thereto, a shank, at least one rear side hook attached to each side of said shank toward the rear end of said shank and extending downwardly from said shank at an angle less than 90° and biasing out from said shank at an angle less than 90°, means to force said rear side hooks toward one another, means to retain said rear side hooks so forced in a substantially fixed position, at least one forward side hook attached to each side of said shank toward the forward end of said shank and extending downwardly from said shank at an angle less than 90° and out from said shank at an angle less than 90°, means to force said forward side hooks toward one another, means to retain said forward side hooks so forced in a substantially fixed position, and a resilient harnessing means of substantially tubular configuration fixed to the downward side of said shank and extending substantially parallel thereto so that said harnessing means extends between the said forward side hooks and between the said rear side hooks.

5. A live bait holder comprising means for attaching a line thereto, a shank, at least one rear side hook attached to each side of said shank toward the rear end of said shank and extending downwardly from said shank at an angle less than 90° and biasing out from said shank at an angle less than 90°, a freely slidable ring surrounding said rear hooks at a point near their attachment to said shank, so that rearward movement of said ring forces said rear side hooks toward one another, means to retain said rear side hooks so forced in a substantially fixed position, at least one forward side hook attached to each side of said shank toward the forward end of said shank and extending downwardly from said shank at an angle less than 90° and out from said shank at an angle less than 90°, a freely slidable ring surrounding said shank and said forward side hooks at a point near their attachment to said shank, so that rearward movement of said ring forces said forward side hooks toward one another, means to retain said forward side hooks so forced in a substantially fixed position, and a resilient harnessing means of substantially tubular configuration fixed to the downward side of said shank and extending substantially parallel thereto so that said harnessing means extends between the said forward side hooks and between the said rear side hooks.

6. A live bait holder comprising a shank, an eyelet formed in the forward end of said shank, an upturned rear hook attached to the rear end of said shank and extending rearwardly therefrom, at least one rear side hook attached to each side of said shank toward the rear end of said shank and extending downwardly from said shank at an angle less than 90° and biasing out from said shank at an angle less than 90°, a freely slidable ring surrounding said rear hooks at a point near their attachment to said shank, so that rearward movement of said ring forces said rear side hooks toward one another, means to retain said rear side hooks so forced in a substantially fixed position, at least one forward side hook attached to each side of said shank toward the forward end of said shank and extending downwardly from said shank at an angle less than 90° and out from said shank at an angle less than 90°, a freely slidable ring surrounding said shank and said forward side hooks at a point near their attachment to said shank, so that rearward movement of said ring forces said forward side hooks toward one another, means to retain said forward side hooks so forced in a substantially fixed position, and a resilient harnessing means of substantially tubular configuration fixed to the downward side of said shank and extending substantially parallel thereto so that said harnessing means extends between the said forward side hooks and between the said rear side hooks.

References Cited in the file of this patent

UNITED STATES PATENTS

| 914,478 | Bradley et al. | Mar. 9, 1909 |
| 990,095 | Balcolm | Apr. 18, 1911 |
| 1,386,061 | Johnson | Aug. 2, 1921 |
| 2,402,730 | Bucks | June 25, 1946 |
| 2,870,563 | Rose | Jan. 27, 1959 |

FOREIGN PATENTS

| 4,879 | Great Britain | 1896 |
| 540,031 | Germany | June 17, 1932 |